Sept. 3, 1940.　　F. G. BROWN ET AL　　2,213,899
PROCESS OF MAKING AN ELASTIC FABRIC
Filed Oct. 19, 1937
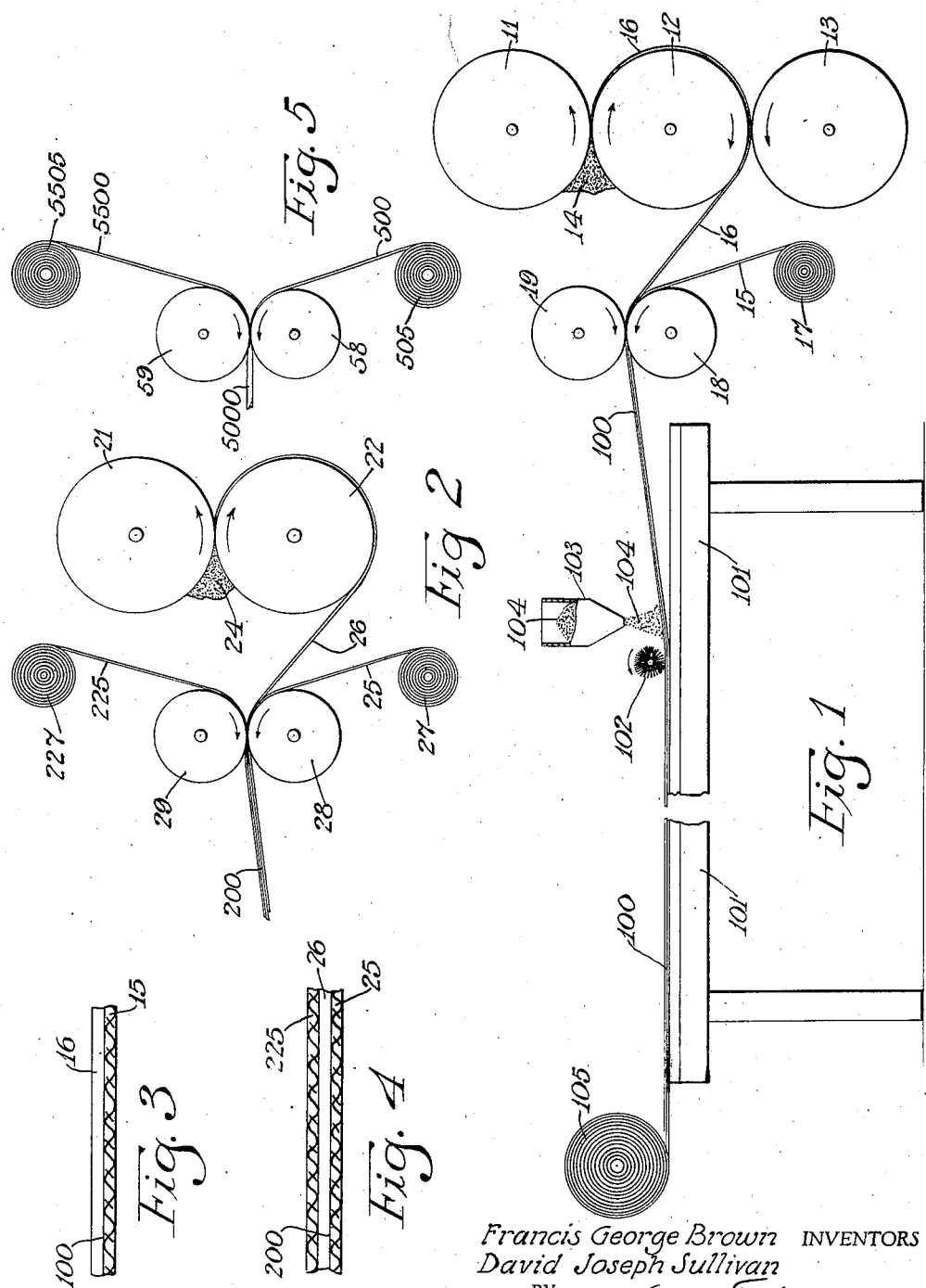
Francis George Brown  INVENTORS
David Joseph Sullivan
BY
ATTORNEY.

Patented Sept. 3, 1940

2,213,899

UNITED STATES PATENT OFFICE 2,213,899

PROCESS OF MAKING AN ELASTIC FABRIC

Francis George Brown and David Joseph Sullivan, Fairfield, Conn., assignors to E. I. du Pont de Nemours & Company, Wilmington, Del., a corporation of Delaware Application October 19, 1937, Serial No. 169,790

2 Claims. (Cl. 154—2)

This invention relates to laminated sheet material suitable for foundation garments, brassières, and the like. More particularly it is concerned with the production of a sheet material comprising securely united rubber and textile laminations and being capable of substantial stretch in both the lengthwise and lateral directions.

Corsets, girdles and similar body molding or restraining garments are considered by the trade to be of superior character when the material from which they are fabricated possesses substantial stretch in both lateral and lengthwise directions. The well known methods of laminating rubber sheets and textile fabrics, for example, by calendering a soft and pliable film of rubber composition on a fabric and thereafter vulcanizing, yield products which have satisfactory stretching properties in the lateral direction of the fabric, but which are capable of little or no stretching in the lengthwise direction thereof. The fact that the fabric or cloth may be capable of stretching substantially in both directions prior to this so-called "rubberizing" does not prevent the formation of a final product having the aforementioned disadvantage. The demand for a "two-way stretch" material for garments of this type has been so great that various expensive procedures such as the use of fabrics woven from fiber-rubber threads of special design have heretofore been resorted to. Such procedures are tedious as well as costly, and make the cost of quality garments in this field comparatively high.

It has now been discovered that a rubberized textile fabric possessing the property of "two-way stretch" to a substantial degree may be produced by a calendering process.

This invention had for an object the preparation of a "two-way stretch" rubberized fabric at low cost. Other objects were the preparation of a sheet material, having rubber and textile laminae, which was capable of stretching in both its warp and filler directions an amount equal to at least one-third of its original dimension without damage to either of the fabric and rubber layers, the preparation of a sheet material having cloth and rubber laminae by an economical process, the preparation of a sheet material having approximately the same stretchability, without permanent damage, as the cloth used in its manufacture, the formulation of a novel process of calendering rubber films to knitted and like fabrics, and the formulation of a new method of operating calendering and combiner rolls. A general advance in the art and other objects which will appear hereinafter are also contemplated.

A sheet material having the aforementioned desirable properties may be prepared by uniting a tough and nervy calendered rubber composition sheet of more than 50% rubber content while under tension to a knitted fabric free from tension, and thereafter vulcanizing the assembly.

From the following description and specific examples, in which are disclosed certain embodiments of the invention as well as details of what is believed to be the best mode for carrying out the invention, it will be apparent how the foregoing objects and related ends are accomplished. The written description is amplified by the accompanying drawing in which:

Figure 1 is a side view somewhat diagrammatically representing one form of an apparatus for carrying out the invention, Figure 2 is a similar view of a modified form of a portion of the apparatus shown in Figure 1, Figure 3 is a diagrammatic section of one form of the laminated sheet material produced according to this invention, Figure 4 is a diagrammatic section of another type of laminated sheet material produced according to this invention, and Figure 5 is a side view somewhat diagrammatically representing another apparatus for producing a product resembling the product produced by the device of Figure 2.

Similar characters refer to similar parts throughout the drawing.

In general this invention comprises preparing a sheet of tough, nervy rubber composition (preferably on a three roll calender), uniting the said sheet of rubber while under tension with a fabric (preferably knitted) having substantial stretch in both lengthwise (warp) and crosswise (filler) directions while free from tension, pressing (preferably by passing through combiner rolls), and thereafter vulcanizing the rubber layer while the laminated material is free from tension or wrinkling (preferably by drum curing).

Referring to the drawing, the numerals 11, 12 and 13 (at the right hand side of Figure 1) indicate the three rolls of an ordinary three roll calender. A supply of the rubber composition to be sheeted is furnished to the top two rolls as indicated at 14. Rotation of rolls 11 and 12 causes the formation of a layer of rubber composition 16 of the desired thickness on the roller 12, which upon continued rotation passes between the rolls 12 and 13, which may place it in the desired condition for combination with a fabric layer. The sheet rubber composition is then continuously withdrawn from the calender by the combiner rolls 18 and 19. At 17 is shown an unbatch roll from which the knitted fabric 15, which is to be combined with the aforementioned rubber sheet 16, is led to the combiner rolls 18 and 19. The speed of rolls 18 and 19 is regulated relative to the speed of the roll 12 so that the sheet of rubber 16 is maintained under tension between the combiner rolls and the roll 12. The unbatch roll 17 is allowed to rotate freely so that the fabric 15 is free of tension at the time it is united with the rubber composition sheet 16. The roll 19 is preferably made of steel or the like, and the coacting roll 18 is preferably made of a resilient material such as rubber or the like. The axes of these combiner rolls are adjusted so that they exert sufficient pressure on the layers of rubber and fabric to firmly combine them. The laminated material 100 is then led on to a table 101 where it is sprinkled with cornstarch (or equivalent material such as talc, mica, potato starch and zinc stearate), indicated at 104, supplied from a hopper 103 to remove the tackiness of the rubber. The cornstarch is evenly distributed by a brush 102 in roller form rotating counterclockwise as indicated by the arrow. After leaving the brushing device 102, the sheet material 100 is supported by the table 101 until it has cooled to approximately room temperature, whereupon it is rolled on a wind-up roll 105. The rolled material is then drum cured in the conventional manner. A temperature of 260° F. (127° C.) for one hour is commonly used.

A preferred rubber composition consists of

| | Parts by weight |
|---|---|
| Pale crepe rubber | 80 |
| Pigment | 1 |
| Zinc oxide | 17 |
| Accelerator | 1 |
| Sulfur | 2 |
| Total | 101 |

When using this composition it is worked to a plasticity of 50–55 (Mooney plastometer) before being placed in the calender and the calender roll 12 is maintained at about 160° F. (71° C.) which is considerably lower than the temperature usually used for rubber compositions of high rubber content. By using this lower temperature there is obtained a sheet of rubber which is tough and nervy as distinguished from the soft and plastic films or sheets commonly known in the art. A rubber sheet .040 inch thick as it leaves the roll 12 has been found to give a laminated material especially suitable for corsets, corselettes, brassières, girdles, the so-called foundation garments, and the like.

In Figure 2 there is illustrated a modified form of apparatus capable of producing a laminated material consisting of a sheet of rubber between and uniting two pieces of textile material. In this figure, 21 and 22 represent two rolls of a calender and correspond to rolls 11 and 12 of Figure 1. The supply of rubber composition is indicated at 24 and the film or rubber composition layer produced therefrom is indicated by the numeral 26. In this form of apparatus two unbatch rolls 27 and 227 are illustrated. The fabric 25 from roll 27 and fabric 225 from roll 227 (both being loose and free from tension) are united to the sheet of rubber 26 (it being taut) on its opposite sides by combiner rolls 28 and 29 to produce a material having three laminae indicated generally by the numeral 200. After leaving the combiner rolls 28 and 29 the material 200 is cooled and vulcanized in the manner previously described for sheet material, the dusting operation, of course, being omitted.

If desired the second ply of cloth may be united in forming three ply material similar to 200 by passing a material like 100 (without dusting and immediately after leaving combiner rolls 18 and 19 if desired) together with a fabric like 225 through another set of combiner rolls.

In Figure 3 there is an enlarged diagrammatic view of the material 100, the relation of the textile layer 15 and the rubber layer 16 being clearly shown and emphasized. A correspondingly enlarged view of the material 200 for the purpose of illustrating the relation of the laminae and 25, 26 and 225 is disclosed in Figure 4.

In Figure 5 there is illustrated a combiner having rolls 58 and 59 which press together and unite sheet materials 500 and 5500. These sheet materials are supplied to the combiner from unbatch rolls 505 and 5505, respectively. The sheet materials 500 and 5500 are laminated products similar to the product 100 (before or after dusting to remove tack) previously described. In preparing the same the calendering apparatus of Figure 2 and the combining apparatus of Figure 1 are preferably used. The dusting or surface finishing indicated in Figure 1 at 102 and 104 is preferably omitted. The rolls of material thus produced (505 and 5505) are then unbatched and combined with their rubber surfaces adjoining as shown in Figure 5. The resultant product 5000, consisting of a layer of rubber uniting two outer fabric layers, is then removed from the combiner and vulcanized as previously described.

A desirable product corresponding to the material 5000 described above may be prepared by uniting material corresponding to 500 and 5500 which has been dusted after leaving the combiner rolls 18 and 19. In following this procedure the single texture material prepared as described in Figure 1 is dusted and cured. The rubber surfaces are then coated with a conventional or standard rubber cement, for example, a gasoline dispersion of

| | Parts |
|---|---|
| Rubber | 75 |
| Rosin | 5 |
| Zinc oxide | 10 |
| Whiting | 10 | and the cement coated surfaces united by passing through combiner rolls in the manner illustrated in Figure 5.

Satisfactory material may also be prepared by partially curing the single face material 100 with the dusted surface as, for example, 15 minutes curing at 250° F. (121° C.), treating the rubber surface of the partially cured sheet material with a gasoline dispersion of the rubber composition calendered to the cloth, uniting two such pieces of material (by placing their cement coated rubber surfaces together and passing through combiner rolls) and thereafter completing the curing by treating for 1¼ hours at 250° F. (121° C.).

As indicated above, drum curing or vulcanization is preferred in carrying out the invention. In this process the laminated cloth and rubber sheet material is wound around a suitable drum in a smooth or wrinkle-free condition, and the assembly thereafter subjected to a vulcanizing temperature, for example, by introducing steam into the drum to heat the walls thereof, or by placing the drum with its wrapping of sheet material in a suitably heated chamber.

Tray curing and conventional festooning vulcanization are less satisfactory than the drum type of curing described above. It is not desired to absolutely restrict the invention to drum curing, however, since the application of a rubber cement base coat on the fabric by spraying before combining permits (to some extent) the employment of other curing methods. Drum curing has been found economical and it produces very satisfactory results.

As will be apparent to those skilled in the art, a variety of rubber compositions may be used in preparing the calendered sheet. These rubber compositions contain 50% or more rubber up to the limit of satisfactory compounding technique. As the rubber content of the rubber composition is lowered, the degree of preservation of the original two-way stretch characteristics of the uncoated fabric is also lowered.

Specific rubber compositions suitable for use in the invention are as follows:

*Example I*

|  | Parts |
|---|---|
| Pale crepe rubber | 47 |
| Zinc oxide | 5 |
| Whiting | 42 |
| Lithopone | 3 |
| Stearic acid | .5 |
| English vermilion | 1/16 |
| Mercaptobenzothiazole | 5/8 |
| Tetramethylthiuram-monosulfide | 1/32 |
| Sulfur | 7/8 |

*Example II*

|  | Parts |
|---|---|
| Pale crepe rubber | 84 |
| Zinc oxide | 5 |
| Stearic acid | .75 |
| White petrolatum | 6 |
| English vermilion | .25 |
| Benzoyl chloride and mercaptobenzothiazole reaction product | 1 |
| Tetramethylthiuram-monosulfide | 3/16 |
| Sulfur | 1 5/8 |

*Example III*

|  | Parts |
|---|---|
| Pale crepe rubber | 80 |
| Red pigment | 1 |
| Zinc oxide | 1 |
| Mercaptobenzothiazole | 1 |
| Sulfur | 2 |

These examples are given to illustrate the invention and are not intended to limit the same. Ordinarily in using these compositions raw rubber having a plasticity of about 80 (Mooney) would be compounded with the other ingredients and the resultant composition with a preliminary plasticity of about 52 put through a calender having the top roll at 200° F. (93° C.) and the adjoining roll at 170° F. (77° C.). A soft and pliable rubber composition would have a preliminary plasticity of about 44–45 when handled under such conditions.

Any fabric which possesses substantial two-way stretch will fulfill the requirements of this invention. The term "substantial" as applied to stretch is intended to mean a stretch of at least 35% without damage to the fabric. The degree of stretch desired in the finished product controls to a certain extent the selection of the base fabric. Knitted fabrics have been found to be the most satisfactory for carrying out the invention since they as a class have excellent two-way stretch properties. Cotton stockinettes, rayon stockinettes, silk stockinettes and cotton and rayon mixture stockinettes gives very desirable results. Special knitting procedures designed to yield products with unusual or extreme stretch qualities in warp and filler (lateral) directions give fabrics especially suitable for use in this invention. Laminated products having stretches as high as 85% to 100% have been produced by properly selecting the base fabric.

The thickness of the rubber composition sheet or film which is calendered to the base fabric is varied as required by the weight and strength requirements of the finished garment. A commonly employed thickness is .040 inch. Ordinary apparatus and convention procedures make the practical thickness range one not extending much beyond the limits .010 to .080 inch. Thicknesses in the range .035 to .065 have many practical uses.

The temperature of the calender roll depends upon the amount of rubber contained in the rubber composition and the plasticity of the mix. Any temperature which permits the removal of the rubber film in an elastic and tough condition (as compared to the conventional soft and plastic condition in the customary calendering operations) is satisfactory. Anyone skilled in the art can readily correlate these factors.

The finished product may be perforated or otherwise decorated, for example, by printing, depending upon the use to which the material is to be put.

The product of this invention has all the advantages of the two-way stretch material, without the disadvantage of the accompanying fabrics having rubber threads. In addition, the product of this invention has the advantage of a low cost of manufacture, since conventional apparatus may be used in its manufacture.

As many apparently widely different embodiments of this invention may be made without departing from the spirit and scope thereof, it is to be understood that we do not limit ourselves to the specific embodiments thereof except as defined in the appended claims.

We claim:

1. A process for preparing laminated sheet material comprising rubber and knitted fabric layers which is suitable for the manufacture of body molding and body restraining garments and which is capable of being stretched at least 35% in both the warp and filler directions of the fabric, said process comprising forming an unvulcanized rubber composition containing a vulcanizing agent and consisting of more than 50% rubber and having a plasticity of about 50–55 as determined by the Mooney plastometer into a thin, tough, nervy sheet by calendering said rubber composition into said sheet from a calendering roll at a temperature below that which vulcanizes said rubber composition and which is sufficiently low to permit its removal from the calendering roll in an elastic and tough condition, applying the thin unvulcanized rubber sheet to a knitted fabric capable of stretching at least 35% in both warp and filler directions, pressing the fabric and rubber layers together while the fabric is free from tension and while the rubber sheet is maintained under tension, releasing tension on the composite sheet, and then heating the laminated product at vulcanizing temperature until said rubber layer is vulcanized.

2. The process set forth in claim 1 wherein said thin rubber sheet is placed between two sheets of said knitted fabric.

FRANCIS GEORGE BROWN.
DAVID JOSEPH SULLIVAN.